United States Patent [19]
Bjelkeby

[11] Patent Number: 5,447,404
[45] Date of Patent: Sep. 5, 1995

[54] SILO DISCHARGE ARRANGEMENT

[75] Inventor: Stig Bjelkeby, örnsköldsvik, Sweden

[73] Assignee: Celltec Engineering AB, Ornskoldsvik, Sweden

[21] Appl. No.: 162,014

[22] PCT Filed: Jun. 3, 1992

[86] PCT No.: PCT/SE92/00383
§ 371 Date: Dec. 3, 1993
§ 102(e) Date: Dec. 3, 1993

[87] PCT Pub. No.: WO92/22487
PCT Pub. Date: Dec. 23, 1992

[30] Foreign Application Priority Data
Jun. 12, 1991 [SE] Sweden .................. 9101806

[51] Int. Cl.$^6$ .................. B65G 65/34; A01F 25/20
[52] U.S. Cl. .................. 414/213; 222/412; 414/310
[58] Field of Search .................. 414/306–312, 414/325, 326, 209, 213; 222/272, 412

[56] References Cited
U.S. PATENT DOCUMENTS

| | | | |
|---|---|---|---|
| 262,498 | 8/1882 | Strayer | 222/272 X |
| 1,415,319 | 5/1922 | Draver | 222/412 |
| 3,091,350 | 5/1963 | Wellford, Jr. et al. | 414/325 |
| 3,260,382 | 7/1966 | Klover | 414/325 X |
| 3,407,943 | 10/1968 | Douglass, Jr. | 414/325 X |
| 3,532,232 | 10/1970 | Sukup | 414/310 X |
| 3,581,916 | 6/1971 | Brumagim | 414/310 X |
| 3,765,548 | 10/1973 | Shivvers | 414/310 |
| 3,935,952 | 2/1976 | Banner | 414/325 |
| 4,361,254 | 11/1982 | Tereaoku et al. | 414/325 X |
| 4,451,192 | 5/1984 | Wood | 414/306 |

FOREIGN PATENT DOCUMENTS

| | | | |
|---|---|---|---|
| 1259249 | 1/1968 | Germany | 414/310 |
| 2010214B2 | 10/1970 | Germany. | |
| 2356161A1 | 5/1975 | Germany. | |
| 95038 | 6/1983 | Japan | 414/325 |
| 180289 | 8/1962 | Sweden. | |
| 324996 | 6/1970 | Sweden. | |
| 1294893 | 3/1987 | U.S.S.R. | 414/325 |

Primary Examiner—David A. Bucci
Attorney, Agent, or Firm—Young & Thompson

[57] ABSTRACT

An arrangement is provided for discharging granular or disintegrated material from silos in predetermined quantities per unit of time. The discharge arrangement includes a rotatable disc (15) which is intended to be placed at the bottom of the silo (1) and which is provided with at least one radially extending channel. A discharge device (21) is rotatably arranged in the channel or in each channel and is provided with recesses for accommodating material in the silo and for moving this material to a position in which it can be discharged from the silo. The discharge device or devices (21) suitably has/have the form of a cylinder provided with axially or helically cut grooves, these grooves forming the aforementioned recesses. A pillar (3) extends centrally through the silo (1), from the disc (15) to an inlet opening (4) in the top of the silo (1). The center pillar (3) and/or the silo wall is provided with a counteracting structure which functions to prevent material in the silo from being entrained by rotation of the disc (15). According to one suitable embodiment, a circularly arranged pipe (25) is placed on top of the disc (15), concentrically with its axis of rotation. The pipe communicates with a heating medium source and is provided with heating medium outlets through which the medium is introduced to the material in the silo (1).

15 Claims, 3 Drawing Sheets

SILO DISCHARGE ARRANGEMENT

BACKGROUND OF THE INVENTION

1. Field of the Invention

The present invention relates to a silo discharge arrangement for discharging woodchips, cellulose pulps and similar material from silos, and more specifically, although not exclusively, to a rotary discharge arrangement which will not prevent the delivery of a heating medium to the material stored in the silo.

2. Description of Prior Art

The invention is primarily intended for use in connection with silos which are intended for the storage and preservation of woodchips, cellulose pulps and comparable materials, to enable such material to be discharged to a material treatment section, e.g. for the manufacture of paper pulp. In this regard, it is important that the material is discharged in specific quantities per unit of time and in a uniform flow from the chip column as a whole, such that the chips will be discharged from the silo essentially in the same order that they entered the silo. Such flow is often referred to as plug flow. Furthermore, it is desirable that a medium, such as steam or hot air, can be introduced into the silo in order to heat or warm the material stored therein prior to continued treatment of said material. In this regard, the so-called plug flow is considered extremely important in achieving uniform and even heating of the material prior to its discharge from the silo, so that some parts of the material will not have a longer silo residence time than other parts and therewith be heated to a greater extent than said other parts, and so that other parts of the material will not have a shorter residence time in the silo and therewith be poorly heated. Even though the material stored in the silo has a relatively uniform lump or piece size, the variations in size of the individual lumps or pieces of material is still sufficient for discharge of the different sizes to take place in different degrees.

Many attempts to solve the aforesaid problem have been made. For instance, an example of the earlier state of the art is found in Swedish published specification No. 324 996, which teaches a rotatable disc having an outwardly turned, arcuate blade placed in the bottom of the silo. The intention of the arcuate blades is to scrape chips from the column of chips upstanding in the silo and to move the chip column out over the peripheral edge of the disc, so that the chip column will fall down into a receiver for further transportation to a receiving station. It has been found, however, that a discharge device of this kind does not effectively receive chips over the whole of its surface and that the majority of chips received arrive from the outermost parts of the chip column, whereas the centre of the column remains practically stationary. This is unimportant, however, from the aspect of heating the chips prior to their discharge, and consequently no problems are encountered with respect to uniform heating of the chips. On the other hand, problems relating to the mixed sizes of the chips are encountered.

Another attempt to solve the aforesaid problem is disclosed in Swedish Patent Specification No. 180 289. In this case, the rotatable disc provided at the bottom of the silo is comprised of two generally semi-circular discs which are constructed to form a helical cutting device having a generally diametrically cutting edge. This arrangement is based on the concept that as the disc rotates, there is cut from the chip column a layer which, in principle, has the form of two helices. Since chips have a tendency to stack, the effect obtained is not satisfactory and the discharge of chips does not come up to expectations. In order words, the cutting effect expected is not achieved due to the properties of the chips.

Both of the aforesaid discharge devices have the draw-back that the chips are able to accompany the disc as it rotates without being discharged by the disc.

SUMMARY OF THE INVENTION

The object of the present invention is to eliminate the aforesaid problems. This object is achieved with a discharge arrangement of the kind defined in the Claims and having the particular characteristic features set forth therein.

BRIEF DESCRIPTION OF THE DRAWINGS

The invention will now be described in more detail with reference to the accompanying drawings, in which.

DESCRIPTION OF THE PREFERRED EMBODIMENT

Figure 1:
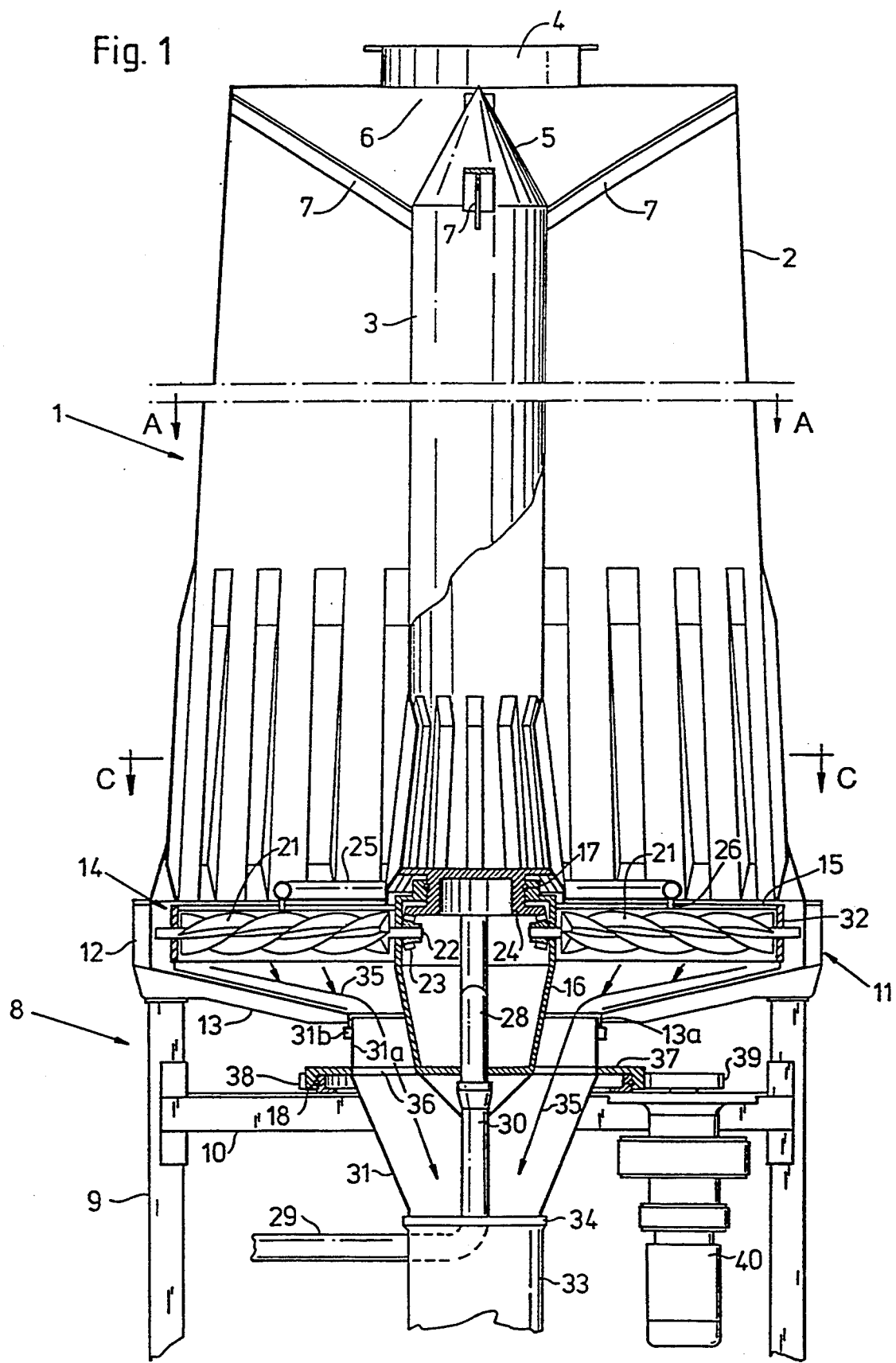
FIG. 1 is a schematic, sectional view of an inventive discharge arrangement placed at the bottom of a chip silo.
Figure 2:
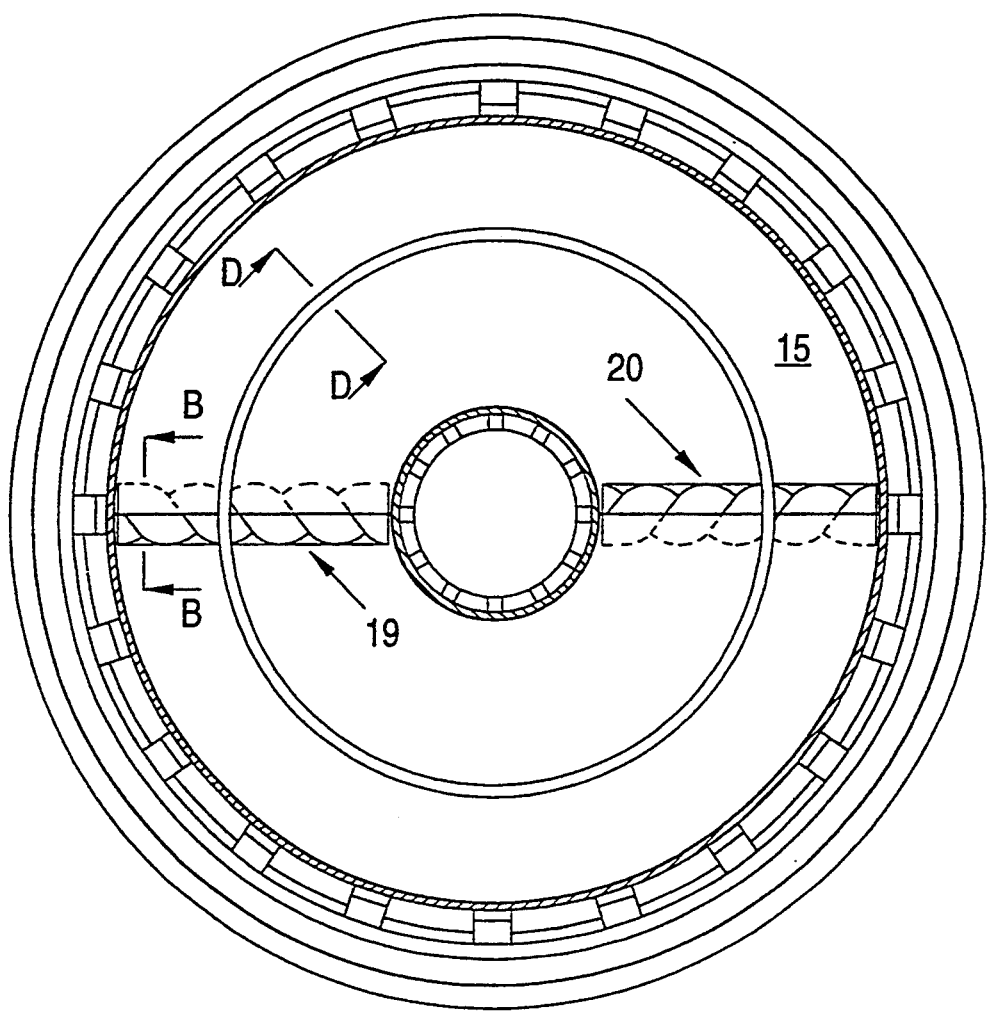
FIG. 2 is a sectional view taken on the line A—A in FIG. 1.

Shown in FIG. 1 is a silo 1 which comprises a circular outer shell 2 having the form of a truncated cone of downwardly increasing diameter. A centre pillar 3 of circular cross-section extends up through the silo 1. A chip inlet opening 4 having a smaller diameter than the upper diameter of the silo 1 is provided centrally in the upper end of said silo. The upper end of the centre pillar 3 is pointed and is located immediately within the confines of the opening 4, so as to form a gap 6 between the defining edge of the opening 4 and the pointed end 5 of the centre pillar 3. The centre pillar 3 is held in position with the aid of ties 7, which extend between the centre pillar 3 and the upper peripheral edge of the silo shell or wall 2.

Both the silo shell 2 and the centre pillar 3 are stationary. A stand structure 8 in the form of legs 9 mutually joined by ties or stays 10 supports a bottom silo part 11 which comprises a circular collar 12 and an annulus 13 which extends inwardly from the collar 12 and slopes downwardly and inwardly and merges with a short cylindrical part 13a. The bottom end of the shell 2 is fixedly connected to the collar 12.

A rotatable discharge device 14 is mounted radially within the circular collar 12. The discharge device is comprised of a generally circular disc 15 which surrounds a hub 16 and is fixedly connected thereto. The upper end of the hub 16 is journalled for rotation at the bottom end of the centre pillar 3 by means of a journal 17, while the bottom end of the hub is journalled to the stand 8 by means of a turning-ring journal 18. The disc 15 of the illustrated embodiment has two radially extending, diametrically positioned channels 19, 20 in which chip discharge means 21 are arranged. The number of discharge devices 21 and the number of radial channels therefor may be one or more, as will be understood from the following description of the manner in which the discharge devices 21 operate. Although not shown in the drawings, downwardly projecting wing-shaped devices are mounted on the undersurface of the disc 15, these wing-shaped devices being obliquely positioned or arcuate in shape so the disc 15 rotates said devices will move the material discharged by the disc 15 and its discharge devices 21 along the upper side of the annulus 13 outwardly and inwardly towards the opening defined by the cylindrical part 13a.

The discharge devices 21 are mutually identical and in the illustrated embodiment have the form of cylindrical screws which are mounted for rotation in the hub 16 and also in a circular flange 32 which extends downwards from the outer peripheral edge of the disc 15. The discharge devices 21 are thus oriented radially in the aforesaid channels 19, 20 formed in the disc 15. Extending from respective discharge devices 21 into the hub 16 is a journal pin 22 on which a gearwheel 23 is fixedly mounted. The gearwheels 23 mesh with a gear ring 24 which is fixedly mounted to the centre pillar 3 at the location of the point where the pillar is journalled to the disc 15. Thus, when the disc 15 rotates, the discharge devices 21 will also rotate. Alternatively, the discharge devices 21 may be provided with axial grooves or with radially and outwardly projecting pins, the essential criterion being that these devices afford sufficient space to receive chips or other material capable of accompanying the discharge devices 21 as they rotate.

An annular ring, or annulus, 25 is attached to the upper side of the disc 15 by means of intermediate supports 26. The annulus 25 is centered in relation to the axis of rotation of the disc 15 and has formed therein narrow, obliquely downwardly directed steam outflow openings 27. The steam is delivered to the tubular annulus 25 through a delivery pipe 28 which extends up through the hub 16 and rotates together with the disc 15 and the hub 16. A delivery pipe 29 extends from an external steam source and is connected to the pipe 28 by means of an impervious slide bearing 30 which is positioned outwardly of or beneath the hub 16.

A funnel-shaped element 31 has an upper cylindrical part 31a which connects with the cylindrical part 13a. Relative rotation between the element 31 and the annulus 13 in a sealed fashion is permitted by a slide seal 31b. The funnel-shaped element 31 thus rotates in accompaniment with the hub 16. The lower end of the element 31 merges with a chip outlet pipe 33 and a slide seal 34 is mounted in the junction of the funnel-shaped element with the outlet pipe 33, said seal permitting the element 31 to rotate relative to the stationary outlet pipe 33 under sealed conditions. The chips discharged by the discharge devices 21 fall through a gap defined between the element 31 and the hub 16, down through the element 31 and into the outlet pipe 33, as shown by the arrows 35.

One part of the turning-ring bearing 18 is attached to the cylindrical part 36 of the funnel-shaped element 31, and arms 36 extend down from said part and into the hub 16. Thus, in the case of this construction, the funnel-shaped element 31 and the hub 16 rotate together with said part of the turn ring bearing 18. The arms 36 essentially have the form of spokes belonging to the hub 16, said arms defining therebetween large openings through which the chips or like material can fall unimpeded down into the outlet pipe 33. Mounted adjacent the turn ring bearing 18 is a gearwheel 38 which meshes with a gearwheel 39 mounted on the shaft of a drive motor 40 connected to the stand 8.

Figure 4:
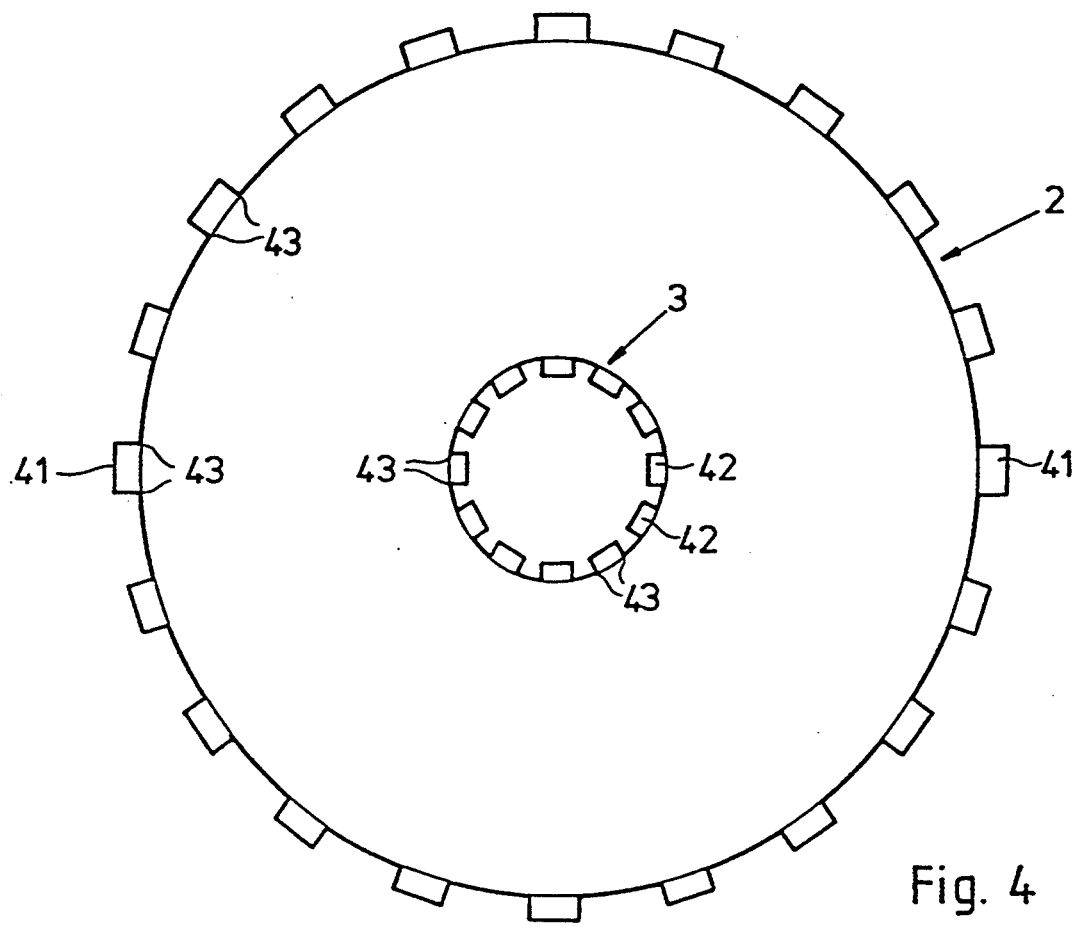
FIG. 4 is a schematic sectional view taken on the line C—C in FIG. 1.
Figure 5:
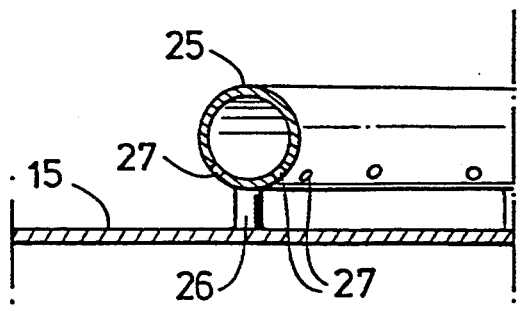
FIG. 5 is a detailed sectional view taken on the line D—D in FIG. 2.

In order to prevent material, for instance chips, stored within the shell 2 from rotating in accompaniment with the discharge devices 14, a counter-acting structure is provided in both the silo shell 2 and in the centre pillar 3. This counter-acting structure, see particularly FIG. 4, is comprised of radially extending projections 41, formed, for instance, by pressing-out or indenting the silo shell 2 along appropriate regions thereof, and radially and inwardly extending projections 42 or the like pressed-out in the centre pillar 3. These indentations extend essentially from the plane of the discharge devices 14 slightly up along the silo shell 2 and the centre pillar 3 respectively. One advantage afforded by the fact that these indentations and projections have been made outwardly from the material path is that there is no encroachment on at least the cross-sectional area of the silo. The projections and indentations 41, 42 are configured so as to form relatively sharp edges or corners 43 on the inner shell surface, these edges or corners thus having an axial extension. The chips or corresponding material located nearest the shell wall and nearest the wall of the centre pillar respectively are acted upon by said edges 43 such as to move the material or chips into the voids or recesses formed by said indentations 41, 42, this material also being subjected to a certain amount of pressure. The material present in the indentations is either shredded or cornered and will project out into the material pillar and therewith hold the same against rotation in accompaniment with rotation of the discharge devices 14. It will be understood that when the material in the silo is under a give pressure, a bond is obtained between the parts of material that extend radially across the silo.

The inventive silo 1 operates in the following manner: A flow of chips is introduced through the infeed opening 4 at the top of the silo 1. The pointed end 5 of the centre pillar 3 causes the chips to spread so as to lie in a ring in the silo 1 around the centre pillar 3. At the same time, steam is introduced through the steam delivery pipe 29 and flows out through the openings 27 in the annulus 25, so as to heat the chips present in the silo 1. The motor 40 is then started-up and the discharge devices 14 begin to rotate.

Figure 3:
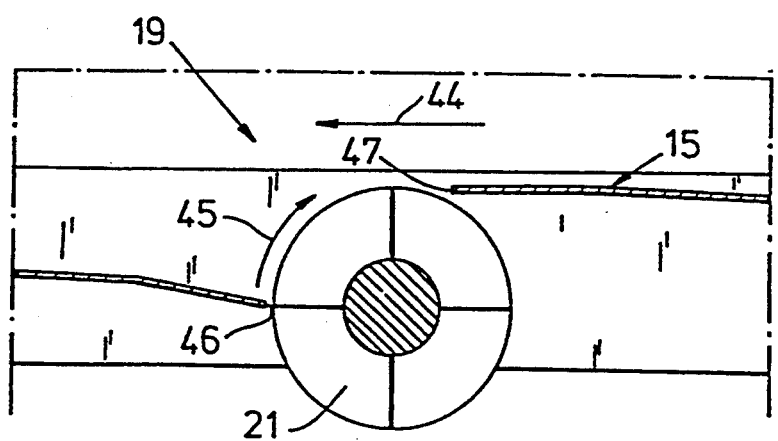
FIG. 3 is a broken, sectional view taken on the line B—B in FIG. 2.

The disc 15 and its channels 19, 20 are constructed in the manner shown primarily in FIG. 3. The arrow 44 indicates the direction in which the disc rotates, while the arrow 45 indicates the direction in which the discharge devices 21 rotate. The disc 15 and the channels 19, 20, of which channel 19 is shown in FIG. 3, are so constructed that the leading edge 46 of the radial channel 19, as seen in the direction of rotation, lies generally level with the centre of rotation of the discharge devices 21, whereas the trailing edge 47 of the radial channel, as seen in the direction of rotation, lies essentially level with the upper periphery of the discharge devices 21. As the disc 15 rotates, the material is pressed gravitationally against the disc 15 without accompanying the disc as it rotates. This material comes into contact with the discharge devices 21 and fills the recesses therein, wherein the force deriving from rotation of the disc 15 and the force of gravity ensure that the material will actually fill the recesses in the discharge devices 21. As the discharge devices 21 rotate in the direction of the arrow 45, material is torn loose from the column of material and is moved round beneath the disc 15. The material then falls down into the outlet 47. The edge 47 will then function as a doctor blade and removes the material that projects slightly beyond the periphery of the discharge devices 21. Thus, when the disc 15 rotates at a given speed and the discharge devices 21 also rotate at a given speed, a given quantity of material per unit of time will be discharged from the silo. That material which does not itself loosen from the discharge devices 21 and fall down is then removed by the underside of the edge 46. The discharge material will be heated extremely uniformly, provided of course that the steam is also delivered uniformly, thereby contributing greatly to an improved in the subsequent treatment stages, for instance chip treatment stages in pulp manufacturing processes.

According to one suitable embodiment of the invention, the silo itself has a height of about 10 meters and a diameter of about 5 meters. It will be understood, however that the silo may have a greater height and that the diameter may vary between about 4 and 7 meters. When heating the contents of the silo, and particularly when heating chips, the silo will preferably accommodate a column height or a chip plug height of at least 10 meters. One advantage of using a centre pillar is that the material in the silo obtains a more uniform height and is therewith discharged more uniformly. The angle of repose of the material for which the silo is intended, primarily woodchips, is about 45°. In the case of a silo which has a diameter of about 7 meters and lacks the provision of a centre pillar, the height of the column of material or the plug in the centre of the silo will be much higher than at the shell wall. The pressures in the column or the plug will differ radically at the centre and the periphery of the plug respectively. This results in material discharge problems and associated heating problems. By distributing the material around a centre pillar, in accordance with the present invention, so that the material will lie in a ring around the pillar, the problem of pressure distribution and therewith the problems of discharging the material from the silo and heating said material are reduced. When the silo has a diameter of 7 meters and no centre pillar is provided, the apex of the plug will be 3½ meters higher in the centre of the silo than at the periphery thereof, whereas when a centre pillar is provided, the plug apex will only be half this height, namely 1.75 meters higher than the periphery height when the diameter of the centre pillar is ignored. This latter case enables the volume of the silo to be used more efficiently, since the silo is able to accommodate an additional volume of material corresponding to the additional height of 1.75 meters.

It will be understood from the aforegoing that the present invention achieves the objects described in the introduction. It will be obvious to the person skilled in this art that the described exemplifying embodiments can be modified. This modifications, however, will lie within the scope of the following Claims. Examples of conceivable modifications include the number of discharge devices chosen, the form of the discharge devices used, and similar modifications.

I claim:

1. A discharge arrangement for discharging granular or disintegrated material from silos in predetermined quantities per unit of time, said arrangement including a circular rotatable disc (15) constituting a bottom of the silo (1) and which is provided with at least one radially extending channel (19, 20), and at least one radially arranged rotatable discharge device (21) provided with recesses for receiving material from the silo (1), said at least one radially arranged rotatable discharge device (21) being in the shape of a cylinder with axial or spiral cut grooves for receiving the material in the silo (1) in predetermined amounts, and being rotatably extended in said at least one radially extending channel (19, 20) in the circular rotatable disc 15 for discharging the material from the silo to a funnel means (13, 30, 33) located beneath the circular rotatable disc (15).

2. An arrangement according to claim 1, characterized in that the channel or channels (19, 20) in the circular rotatable disc (15) is/are configured so that a channel edge (46) adjacent the discharge device (21) is generally level with centre of rotation of the discharge device (21) upstream of said discharge device, as seen in the direction of rotation, and the channel edge (47) adjacent the discharge device (21) downstream of said device (21), as seen in the direction of rotation, is generally level with a peripheral surface of the discharge device at its highest point.

3. An arrangement according to claim 1, characterized by a centre pillar (3) which extends up through the silo (1) from a plane of the rotatable disc (15) to an inlet opening (4) at an upper end of the silo (1).

4. An arrangement according to claim 1, characterized in that a counteracting structure (41, 42) is formed in a shell (2) of the silo (1) and/or in a centre pillar (3) in order to prevent the material in the silo (1) rotating in accompaniment with rotation of the disc (15).

5. An arrangement according to claim 4, characterized in that the counteracting structure (41, 42) has a form of indentations or recessed parts which protrude radially outwards from the silo shell (3) and extend radially inwards in the centre pillar (3).

6. An arrangement according to claim 1, characterized in that a circularly arranged pipe (25) is placed upon the disc (15) concentrically with an axis of rotation of said disc, said pipe being connected to a heating medium source and being provided with heating medium outlets (27).

7. An arrangement according to claim 6, characterized in that the outlets (27) are directed obliquely downwards towards the disc (15).

8. An arrangement according to claim 2, characterized by a centre pillar (3) which extends up through the silo (1) from a plane of the rotatable disc (15) to an inlet opening (4) at an upper end of the silo (1).

9. An arrangement according to claim 2, characterized in that a counter-acting structure (41, 42) is formed in a shell (2) of the silo (1) and/or in a centre pillar (3) in order to prevent the material in the silo (1) rotating in accompaniment with rotation of the disc (15).

10. An arrangement according to claim 3, characterized in that a counter-acting structure (41, 42) is formed in a shell (2) of the silo (1) and/or in a centre pillar (3) in order to prevent the material in the silo (1) rotating in accompaniment with rotation of the disc (15).

11. An arrangement according to claim 10, characterized in that the counteracting structure (41, 42) has a form of indentations or recessed parts which protrude radially outwards from the silo shell (3) and extend radially inwards in the centre pillar (3).

12. An arrangement according to claim 2, characterized in that a circularly arranged pipe (25) is placed upon the disc (15) concentrically with an axis of rotation of said disc, said pipe being connected to a heating medium source and being provided with heating medium outlets (27).

13. An arrangement according to claim 3, characterized in that a circularly arranged pipe (25) is placed Upon the disc (15) concentrically with an axis of rotation of said disc, said pipe being connected to a heating medium source and being provided with heating medium outlets (27).

14. An arrangement according to claim 11, characterized in that a circularly arranged pipe (25) is placed upon the disc (15) concentrically with an axis of rotation of said disc, said pipe being connected to a heating medium source and being provided with heating medium outlets (27).

15. A discharge arrangement for discharging granular or disintegrated material from silos in predetermined quantities per unit of time, said arrangement including a rotatable disc (15) which is positioned at a bottom of the silo (1) and which is provided with at least one radially extending channel (19, 20), characterized in that a discharge device (21) is arranged for rotation in said at least one channel (19, 20); the channel or channels (19, 20) being configured so that a channel edge (46) adjacent the discharge device (21) is generally level with a centre of rotation of the discharge device (21) upstream of said discharge device, as seen in the direction of rotation, and the channel edge (47) adjacent the discharge device (21) downstream of said device (21), as seen in the direction of rotation, is generally level with a peripheral surface of the discharge device at its highest point; and in that the discharge device (21) is provided with recesses which accommodate a given quantity of the material present in the silo (1).

* * * * *